US012504988B2

(12) United States Patent
Bhatia (10) Patent No.: US 12,504,988 B2
(45) Date of Patent: Dec. 23, 2025

(54) METHOD TO HANDLE HETEROGENEOUS INPUT/OUTPUT (I/O) LOAD FOR CONTAINERS RUNNING IN A VIRTUALIZED ENVIRONMENT

(71) Applicant: VMware, Inc., Palo Alto, CA (US)

(72) Inventor: Kashish Bhatia, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 428 days.

(21) Appl. No.: 18/306,950

(22) Filed: Apr. 25, 2023

(65) Prior Publication Data

US 2024/0362050 A1 Oct. 31, 2024

(51) Int. Cl.
G06F 9/455 (2018.01)
G06F 13/16 (2006.01)

(52) U.S. Cl.
CPC ...... *G06F 9/45558* (2013.01); *G06F 13/1668* (2013.01); *G06F 2009/45579* (2013.01); *G06F 2009/45583* (2013.01)

(58) Field of Classification Search
CPC ............ G06F 9/45558; G06F 13/1668; G06F 2009/45579; G06F 2009/45583
USPC .......................................................... 718/1
See application file for complete search history.

(56) References Cited

U.S. PATENT DOCUMENTS

2019/0079747 A1* 3/2019 Sinha ..................... G06F 3/0619
2020/0099721 A1* 3/2020 Golan ..................... H04L 63/20

FOREIGN PATENT DOCUMENTS

WO WO-2017041673 A1 * 3/2017 ............... G06F 3/06

* cited by examiner

*Primary Examiner* — Mardochee Chery
(74) *Attorney, Agent, or Firm* — King Intellectual Asset Management (57) ABSTRACT

The disclosure provides a method for handling heterogeneous input/output (I/O) load for containers running in a virtualized environment. The method generally includes receiving, from an application running in a container, an I/O indicating to write data to a persistent volume backed by a virtual disk file in storage, determining a maximum number of in-flight write I/Os allowed for the persistent volume based on a share of a total write I/O bandwidth assigned to the virtual disk file and allocated to the persistent volume, determining a current number of in-flight write I/Os for the persistent volume, and determining whether the current number of in-flight write I/Os for the persistent volume is greater than or equal to the maximum number of in-flight write I/Os allowed for the persistent volume to determine whether the received I/O is to be rejected or processed.

20 Claims, 8 Drawing Sheets

FIG. 1A

Volume Table 154

| Pseudo Volume $143_1$ ID | → | Mount Point of Pseudo Volume $143_1$ ID | → | Container $130_1$ UUID | → | Persistent Volume $144_1$ UUID |
| Pseudo Volume $143_2$ ID | → | Mount Point of Pseudo Volume $143_2$ ID | → | Container $130_2$ UUID | → | Persistent Volume $144_2$ UUID |
| Pseudo Volume $143_3$ ID | → | Mount Point of Pseudo Volume $143_3$ ID | → | Container $130_2$ UUID | → | Persistent Volume $144_3$ UUID |

FIG. 1B

Virtual Disk File Table 187

| Persistent Volume $144_1$ UUID | → | Virtual Disk File $126_1$ UUID |
| Persistent Volume $144_2$ UUID | → | Virtual Disk File $126_1$ UUID |
| Persistent Volume $144_3$ UUID | → | Virtual Disk File $126_1$ UUID |

FIG. 1C

Container Metadata Table 114

| Container 130₁ UUID | → | Persistent Volume 144₁ UUID | → | Persistent Volume 144₁ Share of Virtual Disk File 126 = 60% | → | Persistent Volume 144₁ Maximum Allowed Write I/O Count = 120 I/Os |
| Container 130₂ UUID | → | Persistent Volume 144₂ UUID | → | Persistent Volume 144₂ Share of Virtual Disk File 126 = 20% | → | Persistent Volume 144₂ Maximum Allowed Write I/O Count = 40 I/Os |
| Container 130₂ UUID | → | Persistent Volume 144₃ UUID | → | Persistent Volume 144₃ Share of Virtual Disk File 126 = 20% | → | Persistent Volume 144₃ Maximum Allowed Write I/O Count = 40 I/Os |

From FIG. 2A

218 — COMMUNICATE, BETWEEN THE CONTAINER MANAGEMENT MODULE, A CONTAINER PROXY, AND THE CONTAINER DRIVER, THE UUID OF THE CONTAINER, THE UUID OF THE PERSISTENT VOLUME, AND THE SHARE OF THE MAXIMUM AMOUNT OF ALLOWED I/Os ON THE VIRTUAL DISK FILE THAT IS ALLOCATED TO THE PERSISTENT VOLUME

220 — ADD, BY THE CONTAINER PROXY, A MAPPING OF <PSEUDO VOLUME ID, MOUNT POINT OF PSEUDO VOLUME, CONTAINER UUID, VOLUME UUID> IN A VOLUME TABLE MAINTAINED BY THE CONTAINER PROXY

222 — DETERMINE, BY THE CONTAINER DRIVER, A MAXIMUM I/O COUNT FOR THE PERSISTENT VOLUME BASED ON THE SHARE OF THE MAXIMUM AMOUNT OF ALLOWED I/Os ON THE VIRTUAL DISK FILE THAT IS ALLOCATED TO THE PERSISTENT VOLUME

224 — ADD, BY THE CONTAINER DRIVER, A MAPPING OF <CONTAINER UUID, VOLUME UUID, ALLOCATED SHARE, MAXIMUM I/O COUNT> IN A CONTAINER METADATA TABLE MAINTAINED BY THE CONTAINER DRIVER

226 — ADD, BY THE CONTAINER DRIVER, A MAPPING OF <VOLUME UUID, VIRTUAL DISK FILE UUID> IN A VIRTUAL DISK FILE TABLE MAINTAINED BY THE CONTAINER DRIVER

402
RECEIVE, FROM A CONTAINERIZED APPLICATION AND BY A CONTAINER MANAGEMENT MODULE RESIDING IN A VM WHERE A CONTAINERIZED APPLICATION IS RUNNING, A WRITE I/O FOR AN LBA FROM THE CONTAINERIZED APPLICATION, WHEREIN THE WRITE I/O COMPRISES AN IDENTIFIER OF A PSEUDO VOLUME WHERE THE CONTAINERIZED APPLICATION REQUESTS THE I/O PAYLOAD TO BE WRITTEN

404
DETERMINE, BY THE CONTAINER PROXY, (1) A CONTAINER UNIVERSALLY UNIQUE IDENTIFIER (UUID) OF A CONTAINER WHERE THE CONTAINERIZED APPLICATION IS RUNNING AND (2) A UUID OF A PERSISTENT VOLUME CORRESPONDING TO THE PSEUDO VOLUME

406
APPEND, BY THE CONTAINER PROXY, THE CONTAINER UUID AND THE PERSISTENT VOLUME UUID TO THE WRITE I/O

408
COMMUNICATE, BY THE CONTAINER PROXY TO A CONTAINER DRIVER, THE APPENDED WRITE I/O

410
DETERMINE, BY THE CONTAINER DRIVER, A MAXIMUM WRITE I/O COUNT FOR THE PERSISTENT VOLUME BASED ON A SHARE OF A MAXIMUM AMOUNT OF ALLOWED WRITE I/Os ON A VIRTUAL DISK FILE, WHERE THE PERSISTENT VOLUME IS CREATED, THAT IS ALLOCATED TO THE PERSISTENT VOLUME

412
DETERMINE, BY THE CONTAINER DRIVER, A NUMBER OF IN-FLIGHT WRITE I/Os FOR THE PERSISTENT VOLUME VIA AN IN-FLIGHT I/O COUNTER MAINTAINED BY THE CONTAINER DRIVER FOR THE PERSISTENT VOLUME

METHOD TO HANDLE HETEROGENEOUS INPUT/OUTPUT (I/O) LOAD FOR CONTAINERS RUNNING IN A VIRTUALIZED ENVIRONMENT

BACKGROUND

Virtualization is a process whereby software is used to create an abstraction layer over computer hardware that allows the hardware elements of a single computer to be divided into multiple virtual computers. The software used is called a hypervisor-a small layer that enables multiple operating systems (OSs) to run alongside each other, sharing the same physical computing resources. When a hypervisor is used on a physical server (also known as a bare metal server or a host) in a data center, the hypervisor allows the physical computer to separate its OS and applications from its hardware thereby enabling the creation and management of virtual machines (VMs). The result is that each VM contains a guest OS, virtualized hardware that the OS requires to run, and one or more application(s) and their associated libraries and dependencies. Other types of virtual computing instances (VCIs) may also be used similarly as VMs.

While virtualization enables running multiple OSs on the hardware of a single physical server, containerization, on the other hand, enables deploying multiple applications using the same OS on a single VM or server. In particular, containerization is the packaging of software code with just the OS libraries and dependencies required to run the code (e.g., in a container image) to create a single lightweight executable, referred to as a container, which runs consistently on any infrastructure. Containers simplify delivery of distributed applications, and have become increasingly popular as organizations shift to cloud-native development and hybrid multi-cloud environments.

In order to preserve data generated by a running container, and/or to share data between containers, traditional persistent storage, often referred to as persistent volume(s) or container volume(s), is created for the container. A persistent volume is at least a portion of a virtual disk (e.g., a subset of the blocks of the virtual disk) that, as is known in the art, is an abstraction of a physical storage disk that a container accesses using I/Os as though it was a physical disk. In particular, a virtual disk file is created for one or more persistent volumes, the virtual disk file being stored in physical storage and storing the data corresponding to the one or more persistent volumes. I/O accesses made by a container to its persistent volume are translated by a hypervisor, on a host where the container is deployed, to corresponding accesses to a virtual disk file backing the persistent volume.

To improve I/O scheduling, limited I/O bandwidth may be allocated to each virtual disk file on a host. In particular, limiting the disk I/O bandwidth may help to prevent situations where high disk activities in one persistent volume, backed by a first virtual disk file (generated, for example, by transferring huge amounts of data to/from a container associated with the persistent volume/first virtual disk file), slows down the I/O performance for other containers (e.g., associated with other persistent volumes backed by other virtual disk files) running on a same host. Limiting disk I/O bandwidth sets a maximum number of allowed write I/Os to be pending/queued for the virtual disk file at a time. To limit I/O bandwidth as such, a hypervisor, used to support the deployment of containers on a host, may assign a specified I/O bandwidth to each virtual disk file on the host. Accordingly, disk I/O bandwidth assigned to a virtual disk file may limit write I/Os from containers having persistent volumes backed by the virtual disk file. However, excess write I/Os issued by one of the containers (e.g., having a persistent volume backed by the virtual disk file) may monopolize the allocated I/O bandwidth, thereby negatively impacting write I/O performance for other containers having persistent volumes also backed by the same virtual disk file.

Accordingly, there is a need in the art for techniques for distributing disk I/O bandwidth, allocated to a virtual disk file, between containers whose persistent volumes are backed by the virtual disk file.

It should be noted that the information included in the Background section herein is simply meant to provide a reference for the discussion of certain embodiments in the Detailed Description. None of the information included in this Background should be considered as an admission of prior art.

SUMMARY

One or more embodiments provide a method for writing data in a virtualized computing system. The method generally includes receiving, from a first application running in a first container, a first input/output (I/O) to a first persistent volume, the first I/O indicating to write first data a block associated with a logical block address (LBA). The first persistent volume may be backed by a first virtual disk file in storage. The method generally includes determining a maximum number of in-flight write I/Os allowed for the first persistent volume. The maximum number of in-flight write I/Os allowed for the first persistent volume may be based on a first share of a total write I/O bandwidth assigned to the first virtual disk file, the first shared being allocated to the first persistent volume. The method generally includes determining a current number of in-flight write I/Os for the first persistent volume. The method generally includes determining whether the current number of in-flight write I/Os for the first persistent volume is greater than or equal to the maximum number of in-flight write I/Os allowed for the first persistent volume. When the current number of in-flight write I/Os for the first persistent volume is greater than or equal to the maximum number of in-flight write I/Os allowed for the first persistent volume, the method generally includes rejecting the first I/O. When the current number of in-flight write I/Os for the first persistent volume is not greater than or equal to the maximum number of in-flight write I/Os allowed for the first persistent volume, the method generally includes writing the first data to the block of the persistent volume.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for distributing a virtual disk file's I/O bandwidth among a plurality of persistent volumes (optionally associated with different containers) that are backed by the virtual disk file, are described herein. For example, a plurality of persistent volumes may be created for containers running on a host, where the persistent volumes are backed by a same virtual disk file stored in physical storage and storing the data corresponding to the persistent volumes (e.g., a one-to-many relationship between the virtual disk file and the persistent volumes). Disk I/O bandwidth assigned to the virtual disk file may allow for a maximum of X write I/O operations to be pending/queued for the virtual disk file at a time, where X is any positive integer. To avoid situations where high disk write activity to one persistent volume monopolizes the allocated disk I/O bandwidth for the virtual disk file (e.g., uses a greater share of the X write I/O operations allowed for the virtual disk file than other persistent volumes backed by the same virtual disk file), techniques described herein introduce a mechanism for partitioning the virtual disk file's I/O bandwidth among persistent volumes, backed by the virtual disk file, based on an application type of a containerized application targeted to use each of the persistent volumes backed by the virtual disk file. Example application types that may result in different allocations of disk I/O bandwidth may include time-sensitive applications (e.g., requiring high I/O operations per second (IOPS) when accessing storage), high priority applications, mission-critical applications (e.g., requiring high availability and redundancy), and/or the like.

For example, a user (e.g., administrator) may indicate a share of the disk I/O bandwidth (e.g., a share of the maximum amount of allowed write I/Os to the virtual disk file) that is to be allocated to each persistent volume backed by the virtual disk file, based on an application type of an application targeted to use each persistent volume. Information about the share (e.g., percentage) of disk I/O bandwidth allocated to each persistent volume is stored in a container metadata table maintained by a hypervisor, and more specifically, a container driver running in the hypervisor and configured to manage creation, use (e.g., including I/O scheduling), and deletion of virtual disk files exposed by storage. Further, an in-memory counter may be created for each persistent volume to track in-flight write I/Os issued to each persistent volume at a point in time. As used herein, in-flight write I/Os refers to queued/pending I/O commands to write data to storage that have been sent to storage, but haven't yet completed/been processed. Thus, when a containerized application issues a write I/O request to a persistent volume, created for the container where the application is running, the container driver is configured to check both (1) the counter for the particular persistent volume and (2) allocated I/O bandwidth information stored for the particular persistent volume in the container metadata table, to determine whether the I/O is to be rejected or allowed to process. The write I/O is rejected where a number of in-flight write I/Os issued to the persistent volume are above a percentage of maximum allowed write I/Os for the virtual disk file allocated to the persistent volume.

In this way, one container hogging available I/O bandwidth (e.g., for write operations) may be avoided, and all containers may have a chance to issue write I/Os to their corresponding persistent volumes backed by the virtual disk file (e.g., subject to their allocated portion of the virtual disk file's I/O bandwidth). Further, the techniques described herein support scalability of containerized applications running heterogeneous workloads by distributing more I/O bandwidth to persistent volumes created for containers running higher priority applications.

Figure 1A:
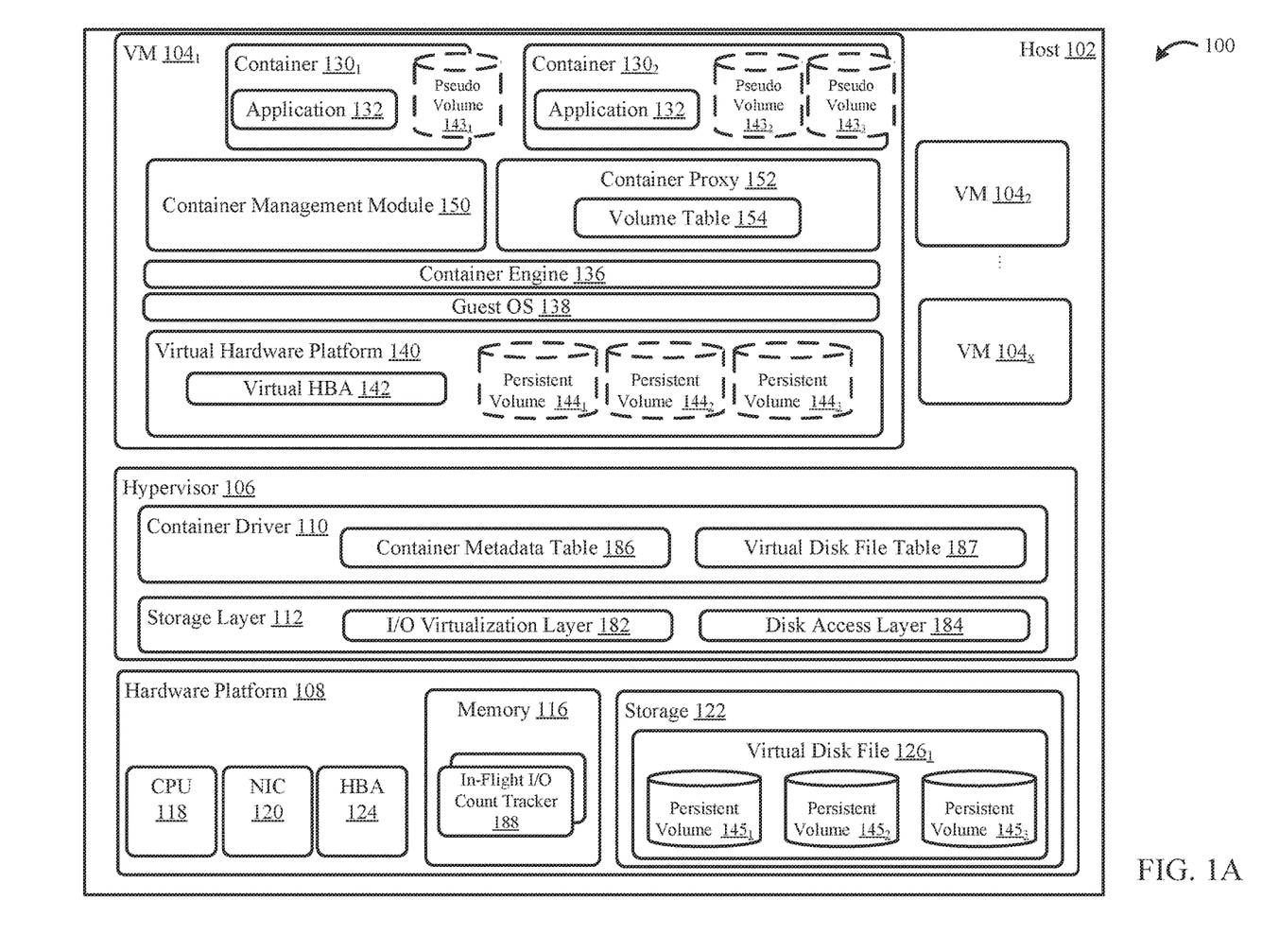
FIG. 1A depicts a computing system in which embodiments described herein may be implemented.

FIG. 1A is a block diagram that illustrates a computing system 100 in which embodiments described herein may be implemented. Computing system 100 includes a host 102 configured to provide a virtualization layer, also referred to as a hypervisor 106, that abstracts processor, memory, storage, and networking resources of hardware platform 108 into multiple VMs $104_1$ to $104_X$ (collectively referred to as VMs 104 and individually referred to as VM 104) that run concurrently on the same host 102.

Each VM 104 implements a virtual hardware platform 140 that supports the installation of a guest OS 138 which is capable of executing one or more applications. Guest OS 138 may be a standard, commodity operating system. Examples of a guest OS include Microsoft Windows, Linux, and the like.

In certain embodiments, each VM 104 further includes a container engine 136 installed therein and running as a guest application under control of guest OS 138. Container engine 136 is a process that enables the deployment and management of virtual instances (referred to interchangeably herein as "containers 130") by providing a layer of OS-level virtualization on guest OS 138 within VM 104. Containers $130_1$ to $130_Y$ (collectively referred to as containers 130 and individually referred to as container 130) are software instances that enable virtualization at the OS level. That is, with containerization, the kernel of guest OS 138 is configured to provide multiple isolated user space instances, referred to as containers. Containers 130 appear as unique servers from the standpoint of an end user that communicates with each of containers 130. However, from the standpoint of the guest OS 138 on which the containers 130 execute, the containers 130 are user processes that are scheduled and dispatched by the OS. Examples of a container engine 136 include the open-source Docker platform made available by Mirantis, Inc. which previously acquired Docker, Inc.

Containers 130 encapsulate an application, such as application 132 as a single executable package of software that bundles application code together with all of the related configuration files, libraries, and dependencies required for it to run. Application 132 may be any software program, such as a word processing program. Bins/libraries and other runtime components are developed or executed separately for each container 130.

In certain embodiments, each VM 104 further includes a container management module 150 and a container proxy 152. Container management module 150, in general, manages each container 130's lifecycle, including, but not limited to, creation, use, and deletion of containers 130 running on container engine 136. In certain embodiments, container management module 150 creates containers 130 based on one or more configuration files that define parameters (e.g., port mappings, storage, etc.) for the containers 130 that are to be deployed on container engine 136.

Container proxy 152 is used to enable communication between VM 104 and hypervisor 106. In particular, container proxy 152 is a tool that allows VM 104 to communicate I/O requests to hypervisor 106 on behalf of containers 130, and more specifically on behalf of applications 132 running in container 130 on VM 104. In certain embodiments, container proxy 152 maintains a volume table 154 that includes mappings of pseudo volume identifiers (e.g., IDs) corresponding to pseudo volumes 143 mounted in containers 130 that correspond to persistent volumes 144. In particular, an I/O request issued by an application 132, running in a container 130 on VM 104, to a persistent volume 144 (e.g., an abstraction of persistent volume 145 backed by storage virtual disk file 126 stored in storage 122) may include an ID of a pseudo volume 143, mounted in the container 130, that corresponds to the persistent volume 144 where the I/O payload is requested to be written. Container proxy 152 intercepts the I/O request and determines the persistent volume 144 associated with the ID of the pseudo volume included in the write I/O, from containerized application 132. Container proxy 152 forwards this I/O request to hypervisor 106, with an identifier of the persistent volume 144, such that the request can be serviced.

Figure 1B:
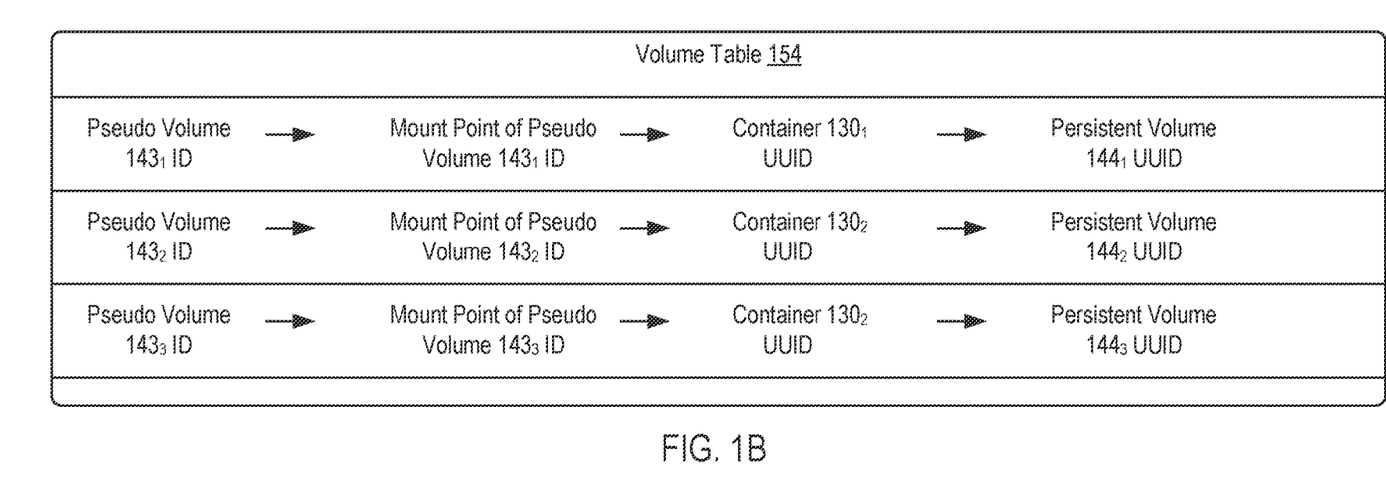
FIG. 1B depicts an example volume table maintained by a container proxy in the computing system of FIG. 1A, according to an example embodiment of the present application.

In certain embodiments, volume table 154 maintains pseudo volume 143 ID, container 130 identifier, and persistent volume 144 identifier information as a key-value database. A key-value database is a key-value data structure that, when given a key, returns a value that is mapped to that key. The key-value mappings are mappings from the key to the value. The key-value database includes a plurality of key-value mappings, each mapping being between (a) the key, which is an ID of a pseudo volume 143, and (b) an identifier of a container 130 where the pseudo volume 143 is mounted, a mount point of the pseudo volume 143 in the container 130, and a persistent volume 144 associated with the container 130 and the pseudo volume 143. For example, as illustrated in FIG. 1B, volume table 154 contains key-value mappings of <Pseudo Volume 143 ID, Mount Point of Pseudo Volume 143, Container 130 universally unique identifier (UUID), Persistent Volume 144 UUID>, where pseudo volume 143 ID is the key.

In certain embodiments, guest OS 138 includes a native file system layer that interfaces with virtual hardware platform 140 to access, from the perspective of each application 132 (and guest OS 138), a data storage host bus adapter (HBA), which in reality, is virtual HBA 142 implemented by virtual hardware platform 140 that provides, to guest OS 138, the functionality of disk storage support to enable execution of guest OS 138 as though guest OS 138 is executing on physical system hardware. In certain embodiments, a virtual disk exposes the same abstraction as a real (physical) disk, that is, a linear list of addressable sectors. However, a hypervisor may store images backing the storage virtual disks as regular disk files shown in FIG. 1A as storage virtual disk file 126 stored on storage 122. Thus, abstractions of persistent volumes 145 created on the virtual disk file 126 may be presented to an application 132 as persistent volume 144 in virtual hardware platform 140, that are mounted as pseudo volumes 143 in containers 130.

From the perspective of each application 132 (and guest OS 138), file system calls are initiated by each containerized application 132 to implement file system-related data transfer and control operations (e.g., read and/or write I/Os), such as to persistent volume 144. Calls are made to a particular persistent volume 144 by referencing a pseudo volume 143 associated with the particular persistent volume 144. Such calls are translated by guest OS 138 into disk sector I/O requests that are passed through virtual HBA 142 to hypervisor 106. Hypervisor 106, then translates these requests into file access requests from persistent volumes 145 backed by virtual disk file 126. In the case that storage 122 is a centralized storage system such as a storage area network (SAN) device or system, the data transfer and control operations may be passed through various layers of hypervisor 106 to true hardware HBAs 124 or network interface cards (NICs) 120 that connect to storage 122 as described in more detail below.

Storage 122 represents persistent storage devices (e.g., one or more hard disks, flash memory modules, solid state drives (SSDs), and/or optical disks). Although the example embodiment shown in FIG. 1A illustrates storage 122 as local storage in hardware platform 108, in some embodiments, storage 122 is storage externally coupled to host 102.

Storage 122 may store one or more storage virtual disk files 126. Storage virtual disk files 126 may have one or more persistent volumes 145 corresponding to one or more persistent volumes 144 that VMs 104 and containers 130 access. Each persistent volume 144 is a virtual storage for one or more containers 130 that has been manually provisioned, e.g., by an administrator, or dynamically or automatically provisioned. In certain embodiments, each persistent volume 144 is an abstraction (e.g., shown using dashed lines in virtual hardware platform 140 in FIG. 1A) of a persistent volume 145, in storage 122, backed by a file, such as a .vmdk or .vhd file or the like, containing a virtual disk image. In certain embodiments, each persistent volume 144 has a lifecycle independent of any individual container 130 that uses the persistent volume 144. Accordingly, when all containers 130 associated with a persistent volume 144 are removed from host 102 (e.g., all containers 130 are no longer running), persistent volume 144 may still exist.

Figure 1C:
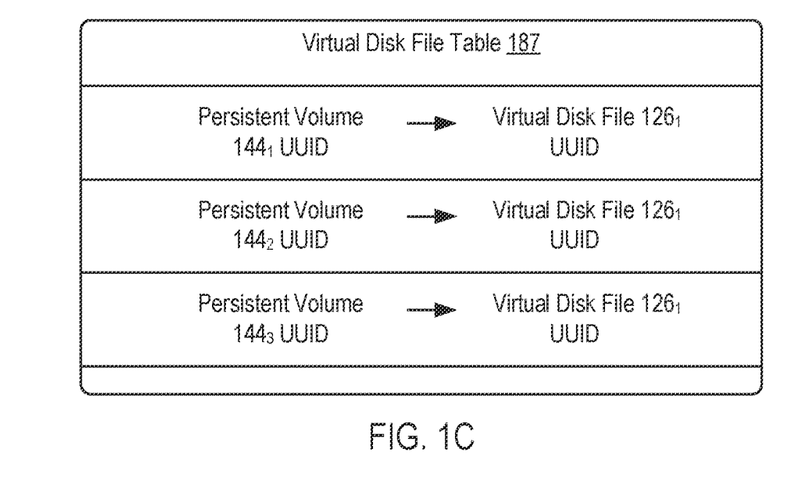
FIG. 1C depicts an example virtual disk file table maintained by a container driver in the computing system of FIG. 1A, according to an example embodiment of the present application.

In certain embodiments, mappings between persistent volumes 144 and virtual disk files 126 are maintained in a virtual disk file table 187 by container driver 110. For example, as shown in FIG. 1C, virtual disk file table 187 maintains this information as a key-value database. The key-value database includes a plurality of key-value mappings, each mapping being between (a) the key, which is an identifier of a persistent volume 144, and (b) the value, which is an identifier of a virtual disk file 126 where a persistent volume 145, corresponding to the persistent volume 144, was created. For example, as illustrated in FIG. 1C, virtual disk file table 187 contains key-value mappings of <Persistent Volume 144 UUID, Virtual Disk File 126 UUID>, where the persistent volume 144 UUID is the key.

A storage layer 112 in hypervisor 106 is configured to receive and understand disk block-based I/O requests from guest OS 138, received via virtual HBA 142, through container proxy 152 running in VM 104 and a container driver 110 running in hypervisor 106. For example, container driver 110 is configured to receive, from container proxy 152, disk block-based operations for writing data (e.g., for an application 132) to a persistent volume 144 and transferring such requests to storage layer 112. Prior to transferring the write requests to storage layer 112, however, container driver 110 is configured to determine (1) a maximum number of write I/Os allowed for the persistent volume 144 based on a share of a maximum number of allowed write I/Os to virtual disk file 126 allocated to persistent volume 144 and (2) a number of current in-flight/pending/queued write I/Os for the persistent volume 144. Container driver 110 may reject the write I/O request or transfer the write I/O request to storage layer 112 for processing based on this information. For example, if the number of current in-flight write I/Os, with the addition of the write request, is above the I/O bandwidth allocated to persistent volume 144, then container driver 110 rejects the write I/O request, otherwise container driver 110 transfers the write I/O request to storage layer 112.

In certain embodiments, container driver 110 determines a number of I/Os allowed for the persistent volume 144 based on information stored in a container metadata table 186 maintained by container driver 110. Container metadata table 186 may include mappings of persistent volumes 144 and their associated container 130, as well as provide an indication of what share (e.g., percentage) of a virtual disk file 126's I/O bandwidth (e.g., a virtual disk file 126 backing each persistent volume 144) is allocated to each persistent volume 144 and what this share equates to in terms of number of I/Os allowed to persistent volume 144 at a time.

Figure 1D:
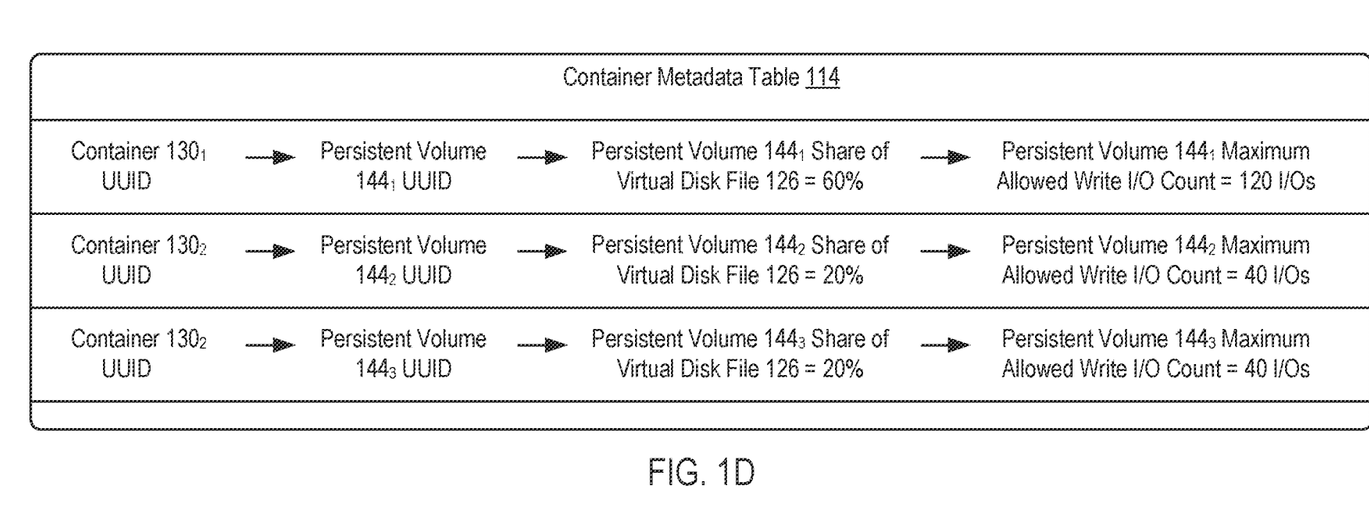
FIG. 1D depicts an example container metadata table also maintained by the container driver in the computing system of FIG. 1A, according to an example embodiment of the present application.

In certain embodiments, container metadata table 186 maintains this information as a key-value database. The key-value database includes a plurality of key-value mappings, each mapping being between (a) the key, which is an identifier of a container 130 and an identifier of a persistent volume 144 associated with the container 130, and (b) the value, which indicates both the percentage of I/O bandwidth allocated to the corresponding persistent volume 144 (and container 130) and what this percentage equates to in terms of number of I/Os allowed on persistent volume 144 at a time. For example, as illustrated in FIG. 1D, container metadata table 186 contains key-value mappings of <Container 130 UUID, persistent volume 144 UUID, persistent volume 144 share of virtual disk file 126, persistent volume 144 maximum allowed write I/O count>, where container 130 UUID and persistent volume 144 UUID pairs are the keys.

In FIG. 1A, one persistent volume $144_1$ is created and assigned to container $130_1$. Further, a second persistent volume $144_2$ and a third persistent volume $144_3$ are created and assigned to container $130_2$. Persistent volumes $144_1$, $144_2$, and $144_3$ are abstractions of persistent volumes $145_1$, $145_2$, and $145_3$ backed by a same storage virtual disk file, specifically storage virtual disk file 126 stored in storage 122. Per instructions provided by a user, persistent volume $144_1$ may be allocated a 60% share of virtual disk file 126's I/O bandwidth, persistent volume $144_2$ may be allocated a 20% share of virtual disk file 126's I/O bandwidth, and persistent volume $144_3$ may be allocated a 20% share of virtual disk file 126's I/O bandwidth. The total I/O bandwidth assigned to virtual disk file 126, which corresponds to a maximum number of pending write I/Os allowed for virtual disk file 126 at a time, is equal to 200 I/O operations (e.g., X=200) in the example. For example, a user may allocate a greater share of the I/O bandwidth to persistent volume $144_1$ where persistent volume $144_1$ is expected to store data for a time-sensitive application 132 to allow for higher IOPS for application 132. Three mappings, one for each persistent volume 144, are provided in container metadata table 186. In particular, a first mapping for persistent volume $144_1$, in container metadata table 186 is <Container $130_1$ UUID, Persistent Volume $144_1$ UUID, Persistent Volume $144_1$ Share of Virtual Disk File 126=60%, Persistent Volume $144_1$ Maximum Allowed Write I/O Count=120 I/Os>. Similar mappings are provided for persistent volume $144_2$ and persistent volume $144_3$, as well.

In addition to maintaining container metadata table 186, in certain embodiments, container driver 110 maintains an in-flight I/O count tracker 188 (simply referred to herein as "counter 188") per persistent volume 144 on host 102. For example, for host 102 in FIG. 1A, container driver 110 maintains three counters 188, one counter 188 for each of the three persistent volumes $144_1$, $144_2$, and $144_3$. Counters 188 are maintained in memory 116. Counters 188 are used to keep track of a number of in-flight write I/Os issued for each persistent volume 144. Container driver 110 references counter 188 associated with a persistent volume 144 when a new write I/O request is issued for the persistent volume 144, to determine whether to reject or allow the I/O. As described above, if the number of current in-flight write I/Os for the persistent volume 144, with the addition of the write request, is above the maximum allowed write I/O count for the persistent volume 144 (e.g., indicated in container metadata table 186), then container driver 110 rejects the write I/O request, otherwise container driver 110 transfers the write I/O request to storage layer 112. If the write I/O request is allowed to process, then container driver 110 increases counter 188 to account for the new in-flight write I/O request. Container driver 110 may decrease counter 188 when data for a write I/O request has been successfully written to the persistent volume 144. Additional details regarding using container metadata table 186 and a counter 188 when processing a write request from a containerized application 132 are described in detail below with respect to FIGS. 4A and 4B.

Storage layer 112 in hypervisor 106 is configured to manage storage space for VMs 104. In one embodiment, storage layer 112 may include numerous logical layers, such as an I/O virtualization layer 182 and a disk access layer 184. In some embodiments, I/O virtualization layer 182 receives a disk block-based I/O from storage layer 112 (in the form of commands, for example, intended for a persistent volume 145) and converts the I/O into disk block-based I/O operations. I/O virtualization layer 182 then issues these disk block-based I/O operations to disk access layer 184 that applies command queuing and scheduling policies to the operations and ultimately sends the operations to components of physical hardware platform 108, and more specifically, storage 122 to read and/or write data to blocks stored in persistent volume 145.

Hardware platform 108 of each host 102 includes components of a computing device such as one or more processors (central processing units (CPUs)) 118, memory 116 (e.g., storing counter(s) 188), a network interface card including one or more network adapters, also referred to as NICs 120, storage 122, HBA 124, and other I/O devices such as, for example, a mouse and keyboard (not shown). CPU 118 is configured to execute instructions, for example, executable instructions that perform one or more operations described herein and that may be stored in memory 116 and in storage 122. NIC 120 enables host 102 to communicate with other devices via a communication medium. HBA 124 couples host 102 to one or more external storages (not shown), such as a storage area network (SAN).

To allow for use of persistent volumes 144 by containers 130, persistent volumes 144 are first created and deployed in host 102. Creating one or more containers 130 and their associated storage (e.g., persistent volume(s) 144) may be based on information defined in a configuration file for the containers 130. The configuration file may be made up of one or more manifests that declare intended infrastructure (e.g., pods, containers, etc.) and applications 132 to be deployed on host 102. The manifests may be JavaScript Object Notation (JSON) files, YAML files, etc., that indicate a number of containers 130, and a number of persistent volumes 144 per container 130, to create and deploy on host 102. As described in more detail below, container management module 150 may use this information contained in the configuration file to create and deploy containers 130, as well as request deployment of their persistent volume(s) 144. As described above, persistent volumes 144 are created and assigned a share of disk I/O bandwidth allocated to a virtual disk file 126 backing the persistent volume, and designated by a user. In certain embodiments, the user specifies the share of the disk I/O bandwidth that is to be allocated to each persistent volume 144 in the configuration file.

Figure 2A:
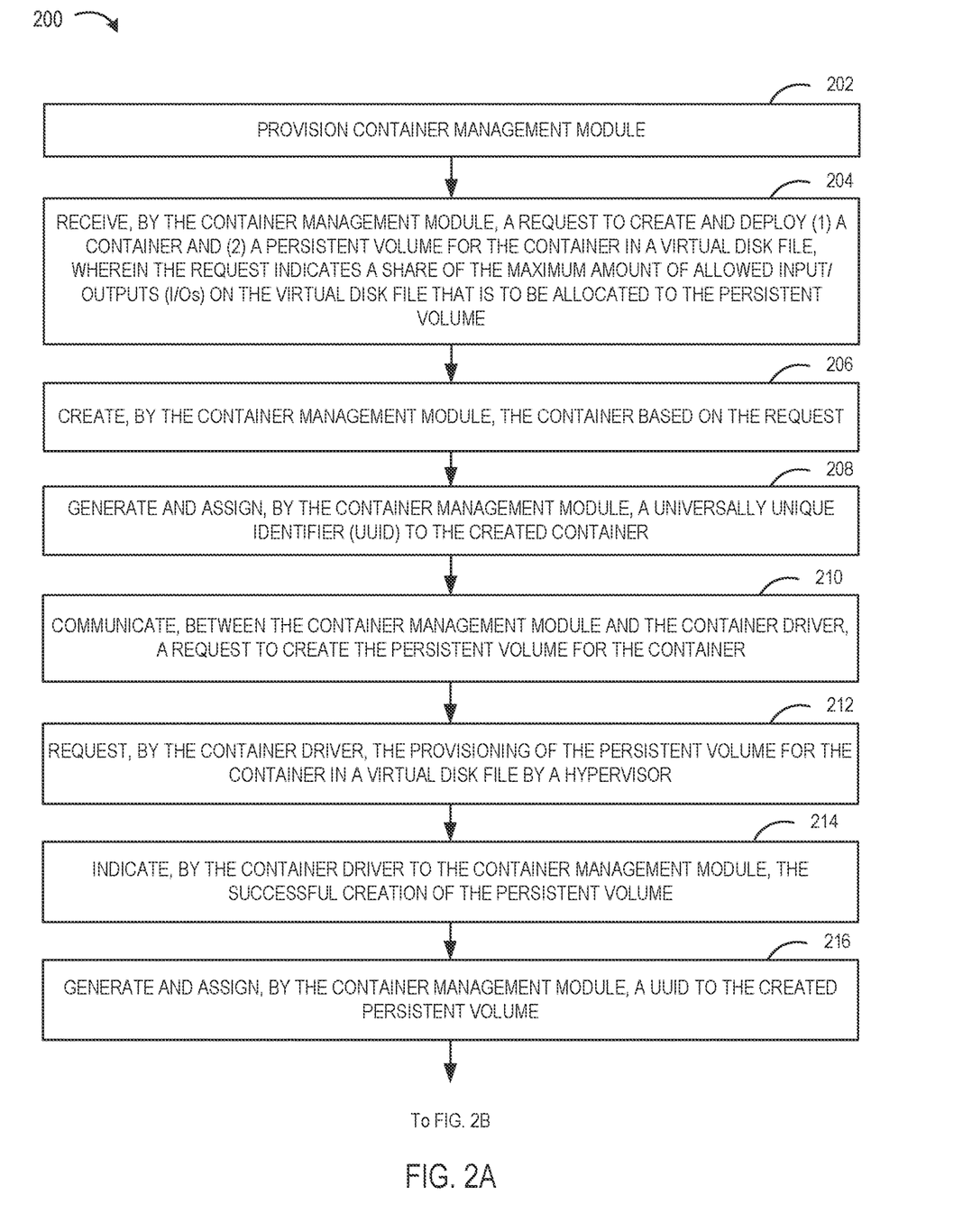
FIGS. 2A and 2B depict an example workflow for creating a container and its associated persistent volume in a virtual disk file, according to an example embodiment of the present application.
Figure 2B:
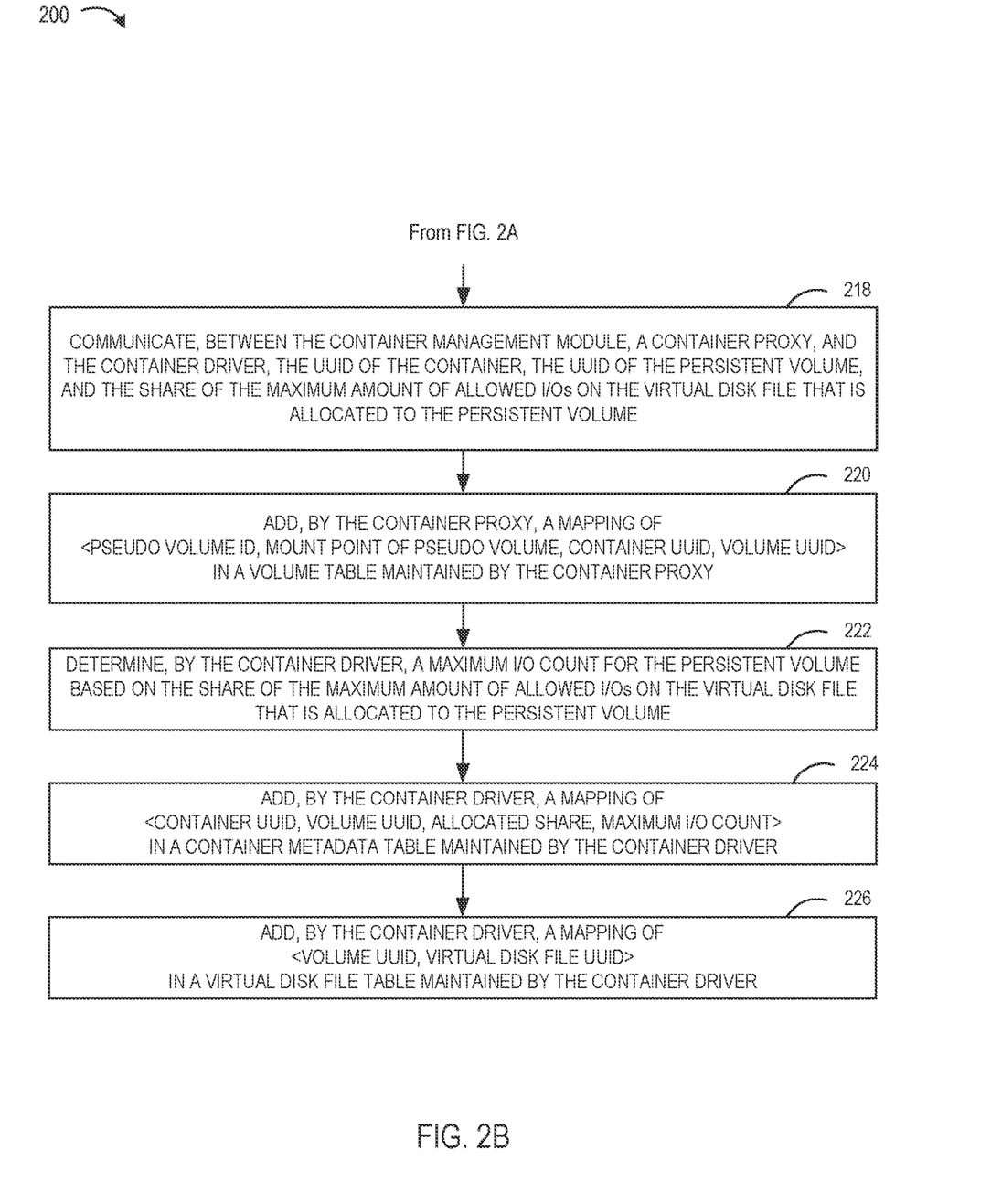

FIGS. 2A and 2B depict an example workflow 200 for creating a container 130 and its associated persistent volume 144 backed by a virtual disk file 126, according to an example embodiment of the present application. For example, workflow 200 may be used to create container $130_1$ and persistent volume $144_1$ in FIG. 1A. Workflow 200 may be performed, for example, by at least container management module 150, container proxy 152, container driver 110, and storage layer 112 illustrated in FIG. 1A.

Workflow 200 begins, at operation 202, by provisioning container management module 150 in VM 104 on host 102. At operation 204, container management module 150 receives a request to create and deploy (1) a container 130 and (2) a persistent volume 144 for container 130 in a virtual disk file 126. Further, the request may indicate a share of the maximum amount of write I/Os allowed to virtual disk file 126 that is to be allocated to persistent volume 144. For example, container management module 150 may receive a request to create and deploy container $130_1$ and persistent volume $144_1$ for container $130_1$, in virtual disk file 126, illustrated in FIG. 1A. The request may indicate that a 60% share of virtual disk file 126's I/O bandwidth (e.g., 60% of 200 I/Os allowed on virtual disk file 126 at a given instance) is to be allocated to persistent volume $144_1$.

In certain embodiments, at operation 204, container management module 150 obtains a configuration file (not shown) comprising one or more manifests that define the configuration of the container 130, and its associated storage (e.g., persistent volume 144), which is to be deployed on host 102. The configuration file may be stored locally or accessed from a remote server according to a request to process the configuration file received from an administrator, orchestrator, or a programmed or configured default configuration file location. In certain embodiments, the configuration file includes an attribute "volumeShare" indicating a share of a maximum amount of write I/Os allowed to a virtual disk file 126 (e.g., where persistent volume 144 is to be deployed) that is to be allocated to persistent volume 144. In the above example, volumeShare for persistent volume $144_1$ associated with container $130_1$ is set to 60%.

At operation 206, container management module 150 creates container $130_1$ based on the request (e.g., the configuration file). At operation 208, a UUID is generated and assigned to container $130_1$ to uniquely identify container $130_1$. The UUID may be generated and assigned by container management module 150.

At operation 210, container management module 150 communicates to container driver 110 (e.g., through container proxy 152) a request to create persistent volume $144_1$ for container $130_1$. The request may be based on storage indicated for container $130_1$ in the configuration file. Although workflow 200 describes creating a single persistent volume 144 for container $130_1$, in certain other embodiments, multiple persistent volumes 144 are to be created for container $130_1$; thus, the request may indicate that more than one persistent volume 144 is to be created for container $130_1$.

At operation 212, container driver 110 requests that hypervisor 106 provision persistent volume $144_1$ for container $130_1$. Hypervisor 106 creates the requested persistent volume $144_1$ based on the request. For example, hypervisor 106 creates persistent volume $144_1$ as an abstraction of a persistent volume $145_1$ created on virtual disk file $126_1$. Persistent volume $144_1$ is assigned and created for use by container $130_1$. In certain embodiments, hypervisor 106 determines which virtual disk file 126 to create persistent volume $145_1$ on based on available capacity among virtual disk files 126 in storage 122 (although only one virtual disk file 126, e.g., virtual disk file $126_1$, is illustrated as being stored in storage 122 in FIG. 1A). In certain embodiments, hypervisor 106 determines which virtual disk file 126 to create persistent volume $145_1$ on using a round-robin method (e.g., a scheduling algorithm that distributes persistent volume 145 creation among multiple virtual disk files 126).

At operation 214, container driver 110 indicates, to container management module 150, that persistent volume $144_1$ has been successfully created for container $130_1$. In response to receiving the indication, at operation 216, container management module 150 generates and assigns a UUID to persistent volume $144_1$. In certain other embodiments, container driver 110 (instead of container management module 150) assigns the UUID to persistent volume $144_1$ subsequent to hypervisor 106 successfully creating persistent volume $145_1$/persistent volume $144_1$ for container $130_1$.

At operation 218 (illustrated in FIG. 2B), container management module 150 communicates to container proxy 152 and container driver 110 (e.g., through container proxy 152) the UUID assigned to container $130_1$, the UUID assigned to persistent volume $144_1$, and the share of the maximum amount of write I/Os allowed to virtual disk file 126 that is to be allocated to persistent volume $144_1$ (e.g., 60% of 200 I/Os allowed on virtual disk file 126 at a given instance).

At operation 220, container proxy 152 associates a pseudo volume 143 (e.g., pseudo volume $143_1$), mounted in container $130_1$, to persistent volume $144_1$ and adds a mapping for this association to a volume table maintained by container proxy 152, such as volume table 154 illustrated in FIG. 1A and FIG. 1B. For example, at operation 222, container proxy 152 generates a volume table entry of <Pseudo Volume $143_1$ ID, Mount Point of Pseudo Volume $143_1$, Container $130_1$ UUID, Persistent Volume $144_1$ UUID>.

At operation 222, container driver 110 determines a maximum write I/O count (e.g., I/O threshold) for persistent volume $144_1$ based on the I/O share allocated to persistent volume $144_1$. For example, persistent volume is allocated 60% of the 200 I/Os allowed on virtual disk file 126 at a given instance (e.g., volumeShare for persistent volume $144_1$ is set to 60%). Thus, at operation 222, container driver 110 calculates the maximum write I/O count for persistent volume $144_1$ to be equal to 120 I/Os (60%*200 I/Os=120 I/Os).

In certain embodiments, a mapping of the UUID assigned to container $130_1$, the UUID assigned to persistent volume $144_1$, the share of I/O bandwidth allocated to persistent volume $144_1$, and the maximum write I/O count for persistent volume $144_1$ are stored in a container metadata table maintained by container driver 110, such as container metadata table 186 in FIGS. 1A and 1D. As such, at operation 222, container driver 110 generates a mapping table entry of <Container $130_1$ UUID, Persistent Volume $144_1$ UUID, 60%, 120 I/Os> and adds the entry to container metadata table 186. This mapping table entry is illustrated in FIG. 1C as the first mapping table entry in container metadata table 186.

Further, in certain embodiments, a mapping of the UUID assigned to persistent volume $144_1$ and a UUID assigned to virtual disk file $126_1$ (e.g., the virtual disk file where persistent volume $145_1$, corresponding to persistent volume $144_1$, was created) are stored in a virtual disk file table, such as virtual disk file table 187 in FIGS. 1A and 1C. As such, at operation 226, container driver 110 generates a mapping table entry of <Persistent Volume $144_1$ UUID, Virtual Disk File $126_1$ UUID> and adds the entry to virtual disk file table 187. This mapping table entry is illustrated in FIG. 1D as the first mapping table entry in virtual disk file table 187.

As described in detail below, the entry stored in container metadata table 186 may be referenced when a new write I/O request is received requesting to write data to persistent volume $144_1$. The entry in container metadata table 186 may be referenced to determine the maximum write I/O count for persistent volume $144_1$, stored in the entry to determine whether or not the new, incoming write I/O request can be processed (e.g., where the maximum write I/O count has not been met, when adding the new, incoming write I/O request to the total number of in-flight write I/Os for persistent volume $144_1$) or needs to be rejected (e.g., where the maximum write I/O count is met). Further, in certain embodiments, the entry stored in volume table 154 may be referenced when a request to delete persistent volume $144_1$ is received by container proxy 152, as described below with respect to FIG. 3.

Figure 3:
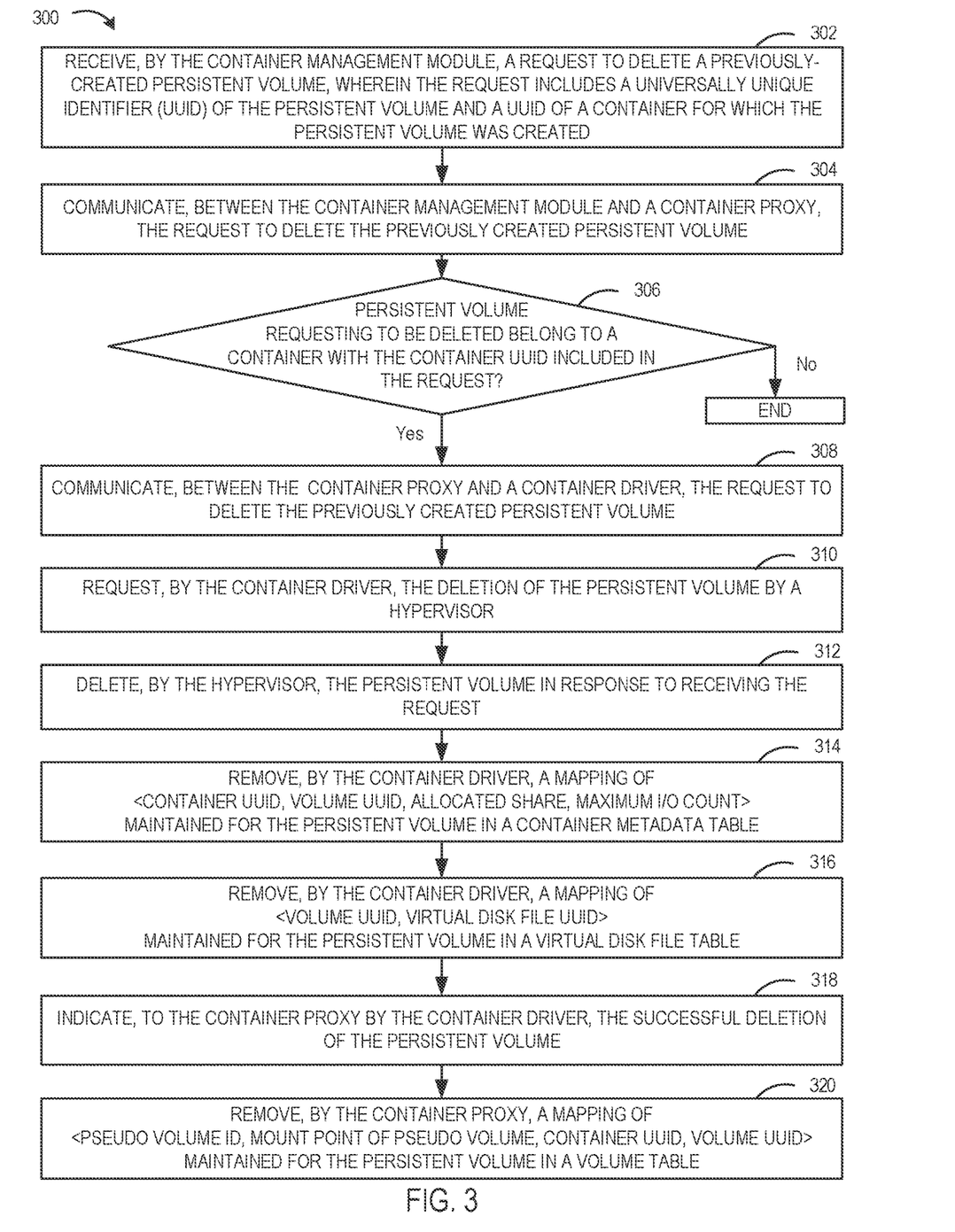
FIG. 3 depicts an example workflow for removing a persistent volume, according to an example embodiment of the present application.

In addition to creating and deploying persistent volumes 144 for containers 130, in certain embodiments, one or more previously-created persistent volumes 144 need to be removed (e.g., deleted). FIG. 3 depicts an example workflow 300 for removing a persistent volume 144, according to an example embodiment of the present application. For example, workflow 300 may be used to remove persistent volume $144_1$ previously created and deployed for container $130_1$ in FIG. 1A. Workflow 300 may be performed, for example, by at least container management module 150, container proxy 152, container driver 110, and storage layer 112 illustrated in FIG. 1A.

Workflow 300 begins, at operation 302, by receiving a request to delete a previously-created persistent volume 144. The request may be received by container management module 150. The request may include a UUID of the persistent volume 144 requested to be deleted and a UUID of a container 130 for which the persistent volume 144 was previously created. For example, the received request may specify that persistent volume $144_1$ associated with container $130_1$ is to be deleted. The request may include a UUID of persistent volume $144_1$, as well as a UUID of container $130_1$ associated with persistent volume $144_1$.

At operation 304, container management module 150 communicates to container proxy 152, the request to delete persistent volume $144_1$. At operation 306, container proxy 152 determines whether persistent volume $144_1$ (e.g., the persistent volume 144 requesting to be deleted) belongs to a container 130 with the container UUID included in the request. In other words, container proxy 152 searches volume table 154 for an entry including both the UUID for container $130_1$ and the UUID for persistent volume $144_1$. In this example, container proxy 152 may locate volume table entry <Container $130_1$ UUID, Persistent Volume $144_1$ UUID, 60%, 120 I/Os> in volume table 154. As such, container proxy 152 determines, at operation 304, that persistent volume $144_1$ belongs to a container 130 with the container UUID included in the request and proceeds to operation 308. In certain other embodiments, an entry volume table 154 may not be found thereby indicating that the persistent volume 144 requesting to be deleted does not belong to a container 130 with the container UUID included in the request. In such embodiments, workflow 300 ends without performing any deletion.

At operation 308, container proxy 152 communicates to container driver 110, the request to delete persistent volume $144_1$. At operation 310, container driver 110 requests that hypervisor 106 delete persistent volume $144_1$ for container $130_1$. In response to receiving the request at operation 310, at operation 312, hypervisor 106 deletes persistent volume $144_1$.

At operation 314, container driver 110 removes a mapping table entry for persistent volume $144_1$ and container $130_1$ in container metadata table 186. For example, container driver 110 removes the first mapping for persistent volume $144_1$ in container metadata table 186 (e.g., <Container $130_1$ UUID, Persistent Volume $144_1$ UUID, 60%, 120 I/Os>) illustrated in FIG. 1D.

At operation 316, container driver 110 removes a mapping table entry for persistent volume $144_1$ in virtual disk file table 187. For example, container driver 110 removes the first mapping for persistent volume $144_1$ in virtual disk file table 187 (e.g., <Persistent Volume $144_1$ UUID, Virtual Disk File $126_1$ UUID>) illustrated in FIG. 1C.

At operation 318, container driver 110 indicates to container proxy 152 that persistent volume $144_1$ has been successfully deleted. As such, at operation 320, container driver 110 removes a volume table entry for persistent volume $144_1$ and container $130_1$ in volume table 154. For example, container proxy 152 removes the first mapping for persistent volume $144_1$ and container $130_1$ in volume table 154 (e.g., <Pseudo Volume $143_1$ ID, Mount Point of Pseudo Volume $143_1$, Container $130_1$ UUID, Persistent Volume $144_1$ UUID>) illustrated in FIG. 1B.

Applications 132 may be deployed in the one or more containers 130 created by container management module 150, such as the container $130_1$ created at operation 206 in FIG. 2A. At least one of these applications 132 may request to write data to storage 122, which in this case is persistent volume $144_1$. Details for processing the write request, from the containerized application 132, are provided in example workflow 400 illustrated in FIGS. 4A and 4B.

Figure 4A:
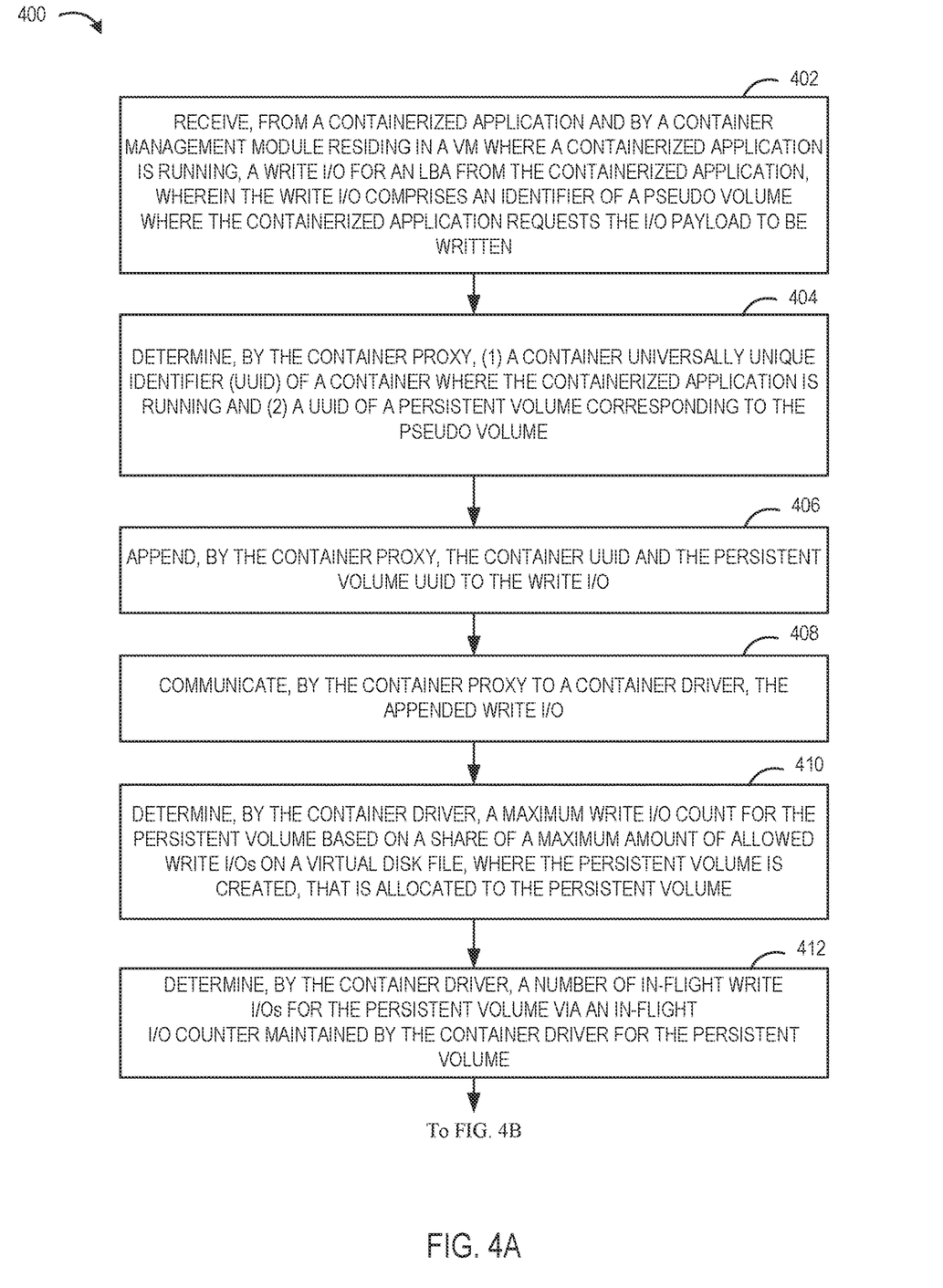
FIGS. 4A and 4B depict an example workflow for processing a write request from a containerized application, according to an example embodiment of the present application.

Workflow 400 begins, at operation 402, by container proxy 152, residing in VM 104, receiving a write I/O for a logical block address (LBA) from a containerized application 132 running in a container 130 on VM 104. The write I/O may include an ID of a pseudo volume 143 mounted in the container 130 that corresponds to a persistent volume 144 where the I/O payload is requested to be written. Further, the write I/O may include an LBA associated with the data payload to be written and/or a length of the I/O. In particular, physical blocks of persistent volume 144 (e.g., of persistent volume 145 backed by virtual disk file 126) may be used to store blocks of data (e.g., data payload), which may be referenced by LBAs. For example, the write I/O received by container proxy 152, from application 132 running in container 130$_1$, may include an ID of pseudo volume 143$_1$ mounted in container 130$_1$ corresponding to persistent volume 144$_1$, e.g., the persistent volume targeted for the write, as well as an LBA for the data payload that is requested to be written.

At operation 404, container proxy 152 determines a container UUID associated with the I/O as the UUID of container 130$_1$ given this is the container 130 where the I/O originated from. Further, container proxy 152 determines a persistent volume UUID associated with the ID of pseudo volume 143$_1$ included in the write I/O from containerized application 132. In this example, the ID of the pseudo volume 143$_1$ corresponds to a UUID for persistent volume 144$_1$. Container proxy 152 may search volume table 154 using <Pseudo Volume 143$_1$ ID> as a key to locate a volume table entry corresponding to this key. Container proxy 152 may locate volume table entry of <Pseudo Volume 143$_1$ ID, Mount Point of Pseudo Volume 143$_1$, Container 130$_1$ UUID, Persistent Volume 144$_1$ UUID> (e.g., first entry illustrated in FIG. 1B) using this key.

At operation 406, container proxy 152 appends the UUID of container 130$_1$ and the UUID of persistent volume 144$_1$ to the write I/O. At operation 408, container proxy 152 communicates the appended write I/O to container driver 110 running in hypervisor 106.

At operation 410, container driver 110 determines a maximum write I/O count for persistent volume 144$_1$ and container 130$_1$. For example, container driver 110 searches container metadata table 186 using <Container 130$_1$ UUID, Persistent Volume 144$_1$> as a key to locate a mapping table entry corresponding to this key. Container driver 110 locates mapping table entry <Container 130$_1$ UUID, Persistent Volume 144$_1$ UUID, 60%, 120 I/Os> (e.g., first entry illustrated in FIG. 1D) using this key. Container driver 110 determines the maximum write I/O count allowed for persistent volume 144$_1$ and container 130$_1$ as 120 I/Os (e.g., last value provided in the located mapping table entry).

At operation 412, container driver 110 further determines a number of in-flight write I/Os that currently exist for persistent volume 144$_1$. In particular, container driver 110 uses an in-flight I/O count tracker 188 (e.g., counter 188) created and maintained for persistent volume 144$_1$ in memory 116 to determine the number of in-flight write I/Os that currently exist for persistent volume 144$_1$. As described above, counter 188 associated with persistent volume 144$_1$ is used to keep track of a number of in-flight write I/Os issued for persistent volume 144$_1$.

At operation 414 (illustrated in FIG. 4B), container driver 110 determines whether a number of in-flight write I/Os for persistent volume 144$_1$ (e.g., number of in-flight write I/Os indicated in counter 188 plus the new, incoming write I/O) is greater than or equal to the maximum write I/O count allowed for persistent volume 144$_1$ (e.g., determined at operation 410).

Figure 4B:
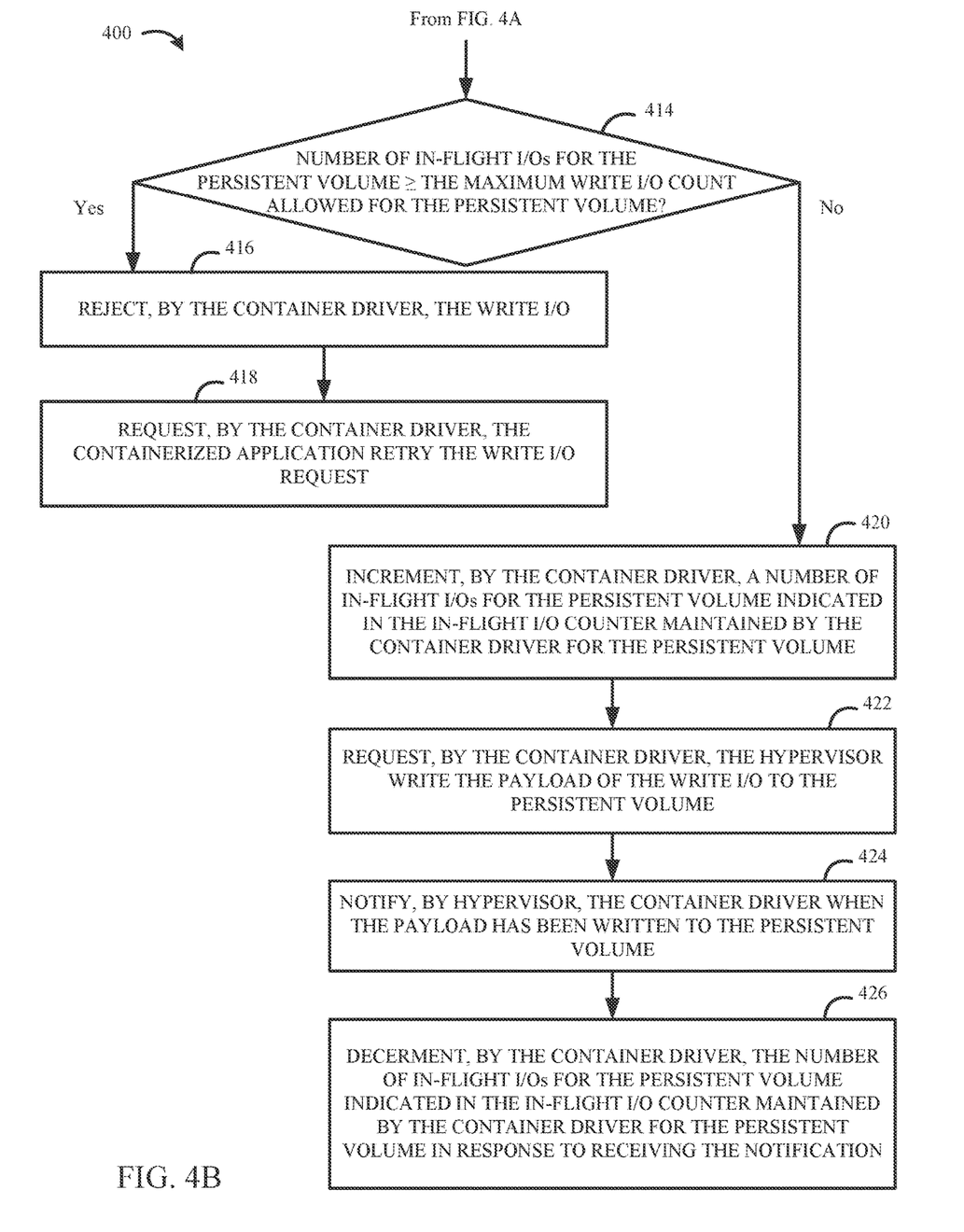

If, at operation 414, the number of in-flight write I/Os for persistent volume 144$_1$ is greater than or equal to the maximum write I/O count allowed for persistent volume 144$_1$, then at operation 416, container driver 110 rejects the write I/O. Further, at operation 418, container driver 110 requests (e.g., through container proxy 152) containerized application 132 retry the write I/O request.

Alternatively, if, at operation 414, the number of in-flight write I/Os for persistent volume 144$_1$ is not greater than or equal to the maximum write I/O count allowed for persistent volume 144$_1$ (e.g., is less than the maximum write I/O count allowed for persistent volume 144$_1$), then at operation 420, container driver 110 increments the number of in-flight I/Os for persistent volume 144$_1$, indicated in associated counter 188, by one.

At operation 422, container driver 110 requests hypervisor 106 to write the payload of the write I/O to persistent volume 144$_1$. In certain embodiments, container driver 110 determines which virtual disk file 126 is to be written to using virtual disk file table 187. In particular, container driver 110 may search virtual disk file table 187 using <Persistent Volume 144$_1$ UUID> as a key to locate a virtual disk file table entry corresponding to this key. Container driver 110 may locate virtual disk file table entry of <Persistent Volume 144$_1$ UUID, Virtual Disk File 126$_1$ UUID> (e.g., first entry illustrated in FIG. 1C) using this key. As such, container driver 110 may request hypervisor 106 write the payload to persistent volume 144$_1$ residing in virtual disk file 126$_1$ (e.g., associated with virtual disk file 126$_1$ UUID). Hypervisor 106 notifies container driver 110 about the written payload when the payload has been successfully written to persistent volume 144$_1$. In response to receiving the notification, container driver 110 decrements the number of in-flight I/Os for persistent volume 144$_1$, indicated in associated counter 188, by one. Thus, counter 188 is updated to accurately reflect the number of in-flight I/Os currently issued for persistent volume 144$_1$.

It should be understood that, for any workflow described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method for writing data in a virtualized computing system, the method comprising:
   receiving, from a first application running in a first container, a first input/output (I/O) to a first persistent volume, the first I/O indicating to write first data to a block of the first persistent volume associated with a logical block address (LBA), wherein the first persistent volume is backed by a first virtual disk file in storage;
   determining a maximum number of in-flight write I/Os allowed for the first persistent volume, wherein the maximum number of in-flight write I/Os allowed for the first persistent volume is based on a first share of a total write I/O bandwidth assigned to the first virtual disk file, the first share being allocated to the first persistent volume;
   determining a current number of in-flight write I/Os for the first persistent volume;
   determining whether the current number of in-flight write I/Os for the first persistent volume is greater than or equal to the maximum number of in-flight write I/Os allowed for the first persistent volume;
   when the current number of in-flight write I/Os for the first persistent volume is greater than or equal to the maximum number of in-flight write I/Os allowed for the first persistent volume, rejecting the first I/O; and
   when the current number of in-flight write I/Os for the first persistent volume is not greater than or equal to the maximum number of in-flight write I/Os allowed for the first persistent volume, writing the first data to the block of the first persistent volume.

2. The method of claim 1, wherein determining the maximum number of in-flight write I/Os allowed for the first persistent volume comprises using an identifier of the first container and the first persistent volume as a key to search a container metadata table to determine the maximum number of in-flight write I/Os allowed for the first persistent volume, the container metadata table comprising:
   a plurality of key-value mappings between a plurality of keys and a plurality of values,
   the plurality of keys each being an identifier of a container and an identifier of a persistent volume associated with the container, and the plurality of values indicating at least a number of in-flight write I/Os allowed for a corresponding persistent volume and container.

3. The method of claim 2, further comprising:
receiving a request to delete the first persistent volume;
deleting the first persistent volume based on the request; and
removing a key-value mapping in the plurality of key-value mappings have a key comprising an identifier of the first container and an identifier of the first persistent volume.

4. The method of claim 1, wherein determining a current number of in-flight write I/Os for the first persistent volume comprises accessing a counter associated with the first persistent volume, the counter being configured to track a number of in-flight write I/Os issued to the first persistent volume.

5. The method of claim 4, further comprising:
prior to writing the first data to the block of the first persistent volume, incrementing the number of in-flight write I/Os issued to the first persistent volume that are tracked by the counter; and
subsequent to writing the first data to the block of the first persistent volume, decrementing the number of in-flight write I/Os issued to the first persistent volume that are tracked by the counter.

6. The method of claim 1, wherein:
the first virtual disk file in the storage backs a plurality of persistent volumes, including the first persistent volume;
the total write I/O bandwidth assigned to the first virtual disk file is divided between the plurality of persistent volumes such that a corresponding percentage of the total write I/O bandwidth is allocated to each of the plurality of persistent volumes; and
the first share is a first percentage of the total write I/O bandwidth assigned to the first virtual disk file.

7. The method of claim 1, wherein an amount of the first share is based on an application type of the first application running in the first container.

8. A system comprising:
one or more processors; and
at least one memory, the one or more processors and the at least one memory configured to:
receive, from a first application running in a first container, a first input/output (I/O) to a first persistent volume, the first I/O indicating to write first data to a block of the first persistent volume associated with a logical block address (LBA), wherein the first persistent volume is backed by a first virtual disk file in storage;
determine a maximum number of in-flight write I/Os allowed for the first persistent volume, wherein the maximum number of in-flight write I/Os allowed for the first persistent volume is based on a first share of a total write I/O bandwidth assigned to the first virtual disk file, the first share being allocated to the first persistent volume;
determine a current number of in-flight write I/Os for the first persistent volume;
determine whether the current number of in-flight write I/Os for the first persistent volume is greater than or equal to the maximum number of in-flight write I/Os allowed for the first persistent volume;
when the current number of in-flight write I/Os for the first persistent volume is greater than or equal to the maximum number of in-flight write I/Os allowed for the first persistent volume, reject the first I/O; and
when the current number of in-flight write I/Os for the first persistent volume is not greater than or equal to the maximum number of in-flight write I/Os allowed for the first persistent volume, write the first data to the block of the first persistent volume.

9. The system of claim 8, wherein to determine the maximum number of in-flight write I/Os allowed for the first persistent volume comprises to use an identifier of the first container and the first persistent volume as a key to search a container metadata table to determine the maximum number of in-flight write I/Os allowed for the first persistent volume, the container metadata table comprising:
a plurality of key-value mappings between a plurality of keys and a plurality of values,
the plurality of keys each being an identifier of a container and an identifier of a persistent volume associated with the container, and
the plurality of values indicating at least a number of in-flight write I/Os allowed for a corresponding persistent volume and container.

10. The system of claim 9, wherein the one or more processors and the at least one memory are further configured to:
receive a request to delete the first persistent volume;
delete the first persistent volume based on the request; and
remove a key-value mapping in the plurality of key-value mappings have a key comprising an identifier of the first container and an identifier of the first persistent volume.

11. The system of claim 8, wherein to determine a current number of in-flight write I/Os for the first persistent volume comprises to access a counter associated with the first persistent volume, the counter being configured to track a number of in-flight write I/Os issued to the first persistent volume.

12. The system of claim 11, wherein the one or more processors and the at least one memory are further configured to:
prior to writing the first data to the block of the first persistent volume, increment the number of in-flight write I/Os issued to the first persistent volume that are tracked by the counter; and
subsequent to writing the first data to the block of the first persistent volume, decrement the number of in-flight write I/Os issued to the first persistent volume that are tracked by the counter.

13. The system of claim 8, wherein:
the first virtual disk file in the storage backs a plurality of persistent volumes, including the first persistent volume;
the total write I/O bandwidth assigned to the first virtual disk file is divided between the plurality of persistent volumes such that a corresponding percentage of the total write I/O bandwidth is allocated to each of the plurality of persistent volumes; and
the first share is a first percentage of the total write I/O bandwidth assigned to the first virtual disk file.

14. The system of claim 8, wherein an amount of the first share is based on an application type of the first application running in the first container.

15. A non-transitory computer-readable medium comprising instructions that, when executed by one or more processors of a computing system, cause the computing system to perform operations for writing data in a virtualized computing system, the operations comprising:

receiving, from a first application running in a first container, a first input/output (I/O) to a first persistent volume, the first I/O indicating to write first data to a block of the first persistent volume associated with a logical block address (LBA), wherein the first persistent volume is backed by a first virtual disk file in storage;

determining a maximum number of in-flight write I/Os allowed for the first persistent volume, wherein the maximum number of in-flight write I/Os allowed for the first persistent volume is based on a first share of a total write I/O bandwidth assigned to the first virtual disk file, the first share being allocated to the first persistent volume;

determining a current number of in-flight write I/Os for the first persistent volume;

determining whether the current number of in-flight write I/Os for the first persistent volume is greater than or equal to the maximum number of in-flight write I/Os allowed for the first persistent volume;

when the current number of in-flight write I/Os for the first persistent volume is greater than or equal to the maximum number of in-flight write I/Os allowed for the first persistent volume, rejecting the first I/O; and when the current number of in-flight write I/Os for the first persistent volume is not greater than or equal to the maximum number of in-flight write I/Os allowed for the first persistent volume, writing the first data to the block of the first persistent volume.

16. The non-transitory computer-readable medium of claim 15, wherein determining the maximum number of in-flight write I/Os allowed for the first persistent volume comprises using an identifier of the first container and the first persistent volume as a key to search a container metadata table to determine the maximum number of in-flight write I/Os allowed for the first persistent volume, the container metadata table comprising:

a plurality of key-value mappings between a plurality of keys and a plurality of values, the plurality of keys each being an identifier of a container and an identifier of a persistent volume associated with the container, and the plurality of values indicating at least a number of in-flight write I/Os allowed for a corresponding persistent volume and container.

17. The non-transitory computer-readable medium of claim 16, wherein the operations further comprise:

receiving a request to delete the first persistent volume;

deleting the first persistent volume based on the request; and removing a key-value mapping in the plurality of key-value mappings have a key comprising an identifier of the first container and an identifier of the first persistent volume.

18. The non-transitory computer-readable medium of claim 15, wherein determining a current number of in-flight write I/Os for the first persistent volume comprises accessing a counter associated with the first persistent volume, the counter being configured to track a number of in-flight write I/Os issued to the first persistent volume.

19. The non-transitory computer-readable medium of claim 18, wherein the operations further comprise:

prior to writing the first data to the block of the first persistent volume, incrementing the number of in-flight write I/Os issued to the first persistent volume that are tracked by the counter; and subsequent to writing the first data to the block of the first persistent volume, decrementing the number of in-flight write I/Os issued to the first persistent volume that are tracked by the counter.

20. The non-transitory computer-readable medium of claim 15, wherein:

the first virtual disk file in the storage backs a plurality of persistent volumes, including the first persistent volume;

the total write I/O bandwidth assigned to the first virtual disk file is divided between the plurality of persistent volumes such that a corresponding percentage of the total write I/O bandwidth is allocated to each of the plurality of persistent volumes; and the first share is a first percentage of the total write I/O bandwidth assigned to the first virtual disk file.

* * * * *